United States Patent [19]

Bruckert et al.

[11] Patent Number: 5,430,761
[45] Date of Patent: Jul. 4, 1995

[54] REDUCED INTERFERENCE THROUGH OFFSET FREQUENCY PARTITIONING

[75] Inventors: Eugene J. Bruckert, Arlington Heights; Michael D. Kotzin, Buffalo Grove, both of Ill.

[73] Assignee: Motorola, Inc., Schaumburg, Ill.

[21] Appl. No.: 250,306

[22] Filed: May 27, 1994

Related U.S. Application Data

[63] Continuation of Ser. No. 797,639, Nov. 25, 1991, abandoned.

[51] Int. Cl.$^6$ ............................................. H04L 27/30
[52] U.S. Cl. ...................................... 375/200; 380/34; 455/33.1; 455/50.1; 455/54.1; 455/54.2; 455/63; 455/67.3
[58] Field of Search .................... 375/1; 380/34; 455/33.1, 34.1, 34.2, 54.1, 54.2, 50.1, 63, 67.3; 370/58.1, 60, 77, 91, 92, 93, 94.1, 95.1, 95.3

[56] References Cited

U.S. PATENT DOCUMENTS

| 4,309,769 | 1/1982 | Taylor, Jr. | 375/1 |
| 4,736,390 | 4/1988 | Ward et al. | 375/75 |

*Primary Examiner*—Bernarr E. Gregory
*Attorney, Agent, or Firm*—Anthony G. Sitko

[57] ABSTRACT

A method of reducing interference within a cellular system (10) by partitioning a designated frequency spectrum within a service coverage area ($\emptyset 1, \emptyset 2$, or $\emptyset 3$) into a first and at least second spectrum inclusive of the designated frequency spectrum, each with an associated power level, and offsetting the spectrums for each TDM frame under the control of an offset number unique to each TDM frame. Assignment of communication units to a spectrum and power level are based upon distance from the base site (as determined through signal strength measurements). The spectral content of spectrums in adjacent service coverage areas is adjusted to include non-coincidental frequencies.

82 Claims, 3 Drawing Sheets

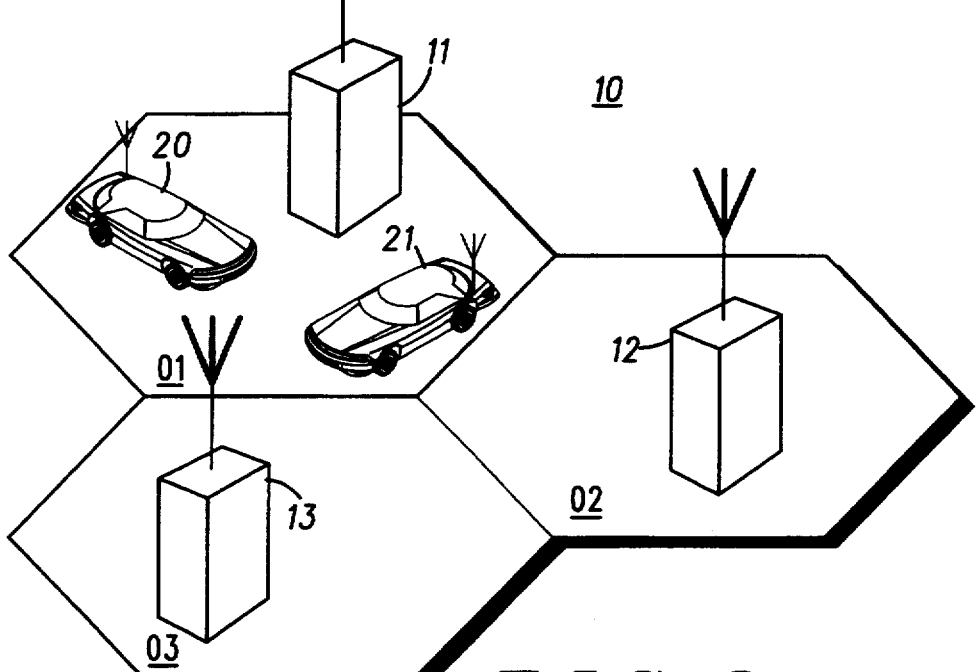

REDUCED INTERFERENCE THROUGH OFFSET FREQUENCY PARTITIONING

This is a continuation of application Ser. No. 07/797,639, filed Nov. 25, 1991 and now abandoned.

FIELD OF THE INVENTION

This invention relates to communication systems and more specifically to cellular communication systems.

BACKGROUND OF THE INVENTION

Cellular communication systems are known. Such systems are, typically, comprised of a number of cells, each having a service coverage area, and a number of cellular telephones (communication units). The service coverage areas of adjacent cells may be arranged to partially overlap in such a manner as to provide a substantially continuous coverage area in which a communication unit receiving service from one cell may be handed off to an adjacent cell with no interruption in service. The Groupe Special Mobile (GSM) Pan-European digital cellular system, as specified in GSM recommendations available from the European Telecommunications Standards Institute (ETSI) and incorporated herein by reference, is an example of just such a system.

A cell's radio coverage is provided by a base transceiver station (BTS). Each BTS may contain one or more transceivers (TRX) which can simultaneously receive on one frequency and transmit on another. Communication between a BTS and a mobile communication unit (or mobile station) (MS) typically occurs using a portion of a pair of frequencies (transmit and receive) temporarily assigned in support of the communication transaction at the BTS.

The pair of frequencies assigned for use at the remote site are typically referred to as a radio channel. Downlink transmissions (from BTS to MS) on the radio channel occur on a first frequency of the pair of frequencies. Uplink transmissions (from MS to BTS) on the radio channel occurs on the second frequency of the pair of frequencies.

The GSM system is a TDM/TDMA system providing eight full duplex signal paths (8 TDM slots per TDM frame) on each radio channel. A single, primary radio channel assigned to a BTS, by virtue of its being time multiplexed, can support up to seven full rate duplex traffic users (speech or data) in addition to a multiplexed common control channel within the eight TDM slots. Additional, secondary radio channels assigned to the same cell can provide a full complement of eight full rate traffic users (in the 8 TDM slots) per radio channel, since the control channel within the primary radio channel can control allocation of communication resources on secondary radio channels.

Transmissions (control or speech and/or data traffic) from a BTS to an MS, on the downlink, occupy a first TDM slot (downlink slot) on a first frequency of a radio channel and transmissions from a communication unit to a BTS, on the uplink, occupy a second TDM slot (uplink slot) on the second frequency of the radio channel. The uplink slot on the second frequency is displaced in time three TDM slot positions following the downlink slot on the first frequency. The uplink slot on the second frequency is offset 45 MHz lower in frequency than the downlink. The uplink slot and downlink slot (together providing a two-way signal path for a single user) may be referred to as a "communication resource", allocated by the BTS to an MS for exchanging signals. The term "communication resource" also typically includes an associated signalling channel, as for example the GSM specified slow associated control channel used with traffic channels.

Exchanges of paging and setup control information between MSs and BTSs typically occurs on the common control channel (CCCH) which occupies at least one slot of a primary channel of the BTS. The CCCH may logically share a slot on the primary channel with a broadcast control channel (BCCH). Transmitted by the BTS on the BCCH are distinctive identification signals as well as synchronization and timing information common to all other frequencies and slots of the BTS. BCCH information allows an MS to differentiate between primary and non-primary channels.

Upon activation, an MS scans a set of frequencies in search of BCCH identification signals transmitted from proximate BTSs. Upon detecting a BCCH identification signal, the communication unit measures a signal quality factor (such as signal strength) of the identification signal as a means of determining relative proximity of the BTS. Upon completing the scan of frequencies within the set, the MS generally selects the BTS providing the largest relative signal quality factor as a serving BTS. Upon identifying, and locking onto a suitably strong signal (and registering if necessary) the communication unit monitors the selected BCCH for incoming calls. Should the communication unit desire to initiate a call, an access request may be transmitted using the CCCH of the serving BTS.

During normal operation (including during active calls), the MS monitors for, identifies, and measures primary channels of nearby BTSs. If involved in an active call, the MS relays measurement information back to the base site on an associated signaling channel. Through such a process, it is possible for the MS to maintain an association with the most appropriate (proximate) BTS. The process may entail an autonomous switching by the MS to a different BTS, causing perhaps a re-registration by the MS with the system indicating that such a switch has occurred. Alternatively, during an active communication exchange, the MS may be commanded by the system to handover to a more appropriate BTS.

The GSM system specification allows for frequency hopping of the radio channel. Under frequency hopping in GSM, the exchange of communicated signals between the BSS and MS may occur on an indexed frequency which may index to a different RF channel after each TDM frame. As is known, the combination of frequency hopping, in conjunction with error correction coding techniques, results in a significant improvement in reception quality and improved signal robustness due to averaged radio channel fading and interference noise.

Channel fading, within cellular communication system in general and as is known in the art, may arise from signal barriers (such as hills or buildings) and/or from multipath signal propagation (Rayleigh fading). Interference noise on a radio channel may arise from the simultaneous operation of MSs on the same or adjacent channels, generating mutually interfering signals.

Simultaneous use of communication channels within a communication system may often be required by a limited frequency spectrum and by the number of users within the system. Simultaneous use of a radio channel may be possible within the system through the maintenance of minimum separation distances between simultaneous channel users. Maintenance of minimum distances may reduce mutual interference within a communication system below a maximum threshold level required by the system.

To maximize the capacity of a cellular radiotelephone system within a given geographic area, operating frequencies must be reused among the cells in such a manner that mutual interference does not exceed the maximum threshold level. Mutual interference, within such systems, is maintained below the maximum threshold level through the use of a reuse pattern.

Mutual interference is typically considered as arising from two sources. One source is co-channel interference and occurs when two cellular radiotelephones transmit on the same frequency. The second source is called adjacent channel interference. Adjacent channel interference typically arises when two radiotelephones operating on adjacent channels attempt to exchange a signal with a cellular base site from different areas of the cell (one near the base site the other near the fringe of the cell). In such a case the magnitude of a received signal from the radiotelephone near the base site "blinds" the base to a signal from the fringe.

The reuse pattern controls co-channel interference by maintaining a minimum distance between reusing base sites. The minimum distance under the reuse pattern is typically specified in terms of cell radius (see Graziano, U.S. Pat. No. 4,128,740).

The reuse pattern controls adjacent channel interference by sequentially assigning frequencies within the cellular system so as to avoid assignment of adjacent channels to the same, or adjacent, cells. Limitations on the use of adjacent frequencies in adjacent cells arises because, by the nature of cells in cellular telephony, a radiotelephone in a first cell may present a stronger signal to a base site in a second cell than another radiotelephone operating from within the second cell.

While prior art reuse methods have worked well considerable spectral efficiency may be lost due to prohibitions on intra-cell adjacent channel utilization and due to multi-cell reuse patterns. A need exists for a radio channel assignment method that accommodates use of intra-cell adjacent channels and that allows for reduced reuse distances (near-cell) of radio channels within a frequency spectrum. Such an assignment method should accommodate frequency hopping methodologies and channels of different bandwidths.

SUMMARY OF THE INVENTION

A method of assigning communication resources within a cell of a cellular communication system is offered. The method includes the steps of grouping communication units based upon a signal metric indicative of distance and assigning the grouped communication units to group subspectra that include a distal subspectrum reserved to distal communication units. The distal subspectrum is non-coincident with distal subspectra of adjacent cells The method also includes offsetting the group subspectra for each TDM frame by an offset number such that interference is avoided.

BRIEF DESCRIPTION OF THE DRAWING

FIG. 1 comprises a simplified block diagram of frequency partitioning of a designated spectrum.

FIG. 2 depicts a three cells of a communication system, under the invention containing two MSs.

FIGS. 3A-3C depict, circular rotation of partitioned frequency subspectra under the invention.

FIG. 7 depicts three circular shift registers partitioned to reflect the locations of subspectra C, M, and F.

DETAILED DESCRIPTION OF THE PREFERRED EMBODIMENT

Figure 4:
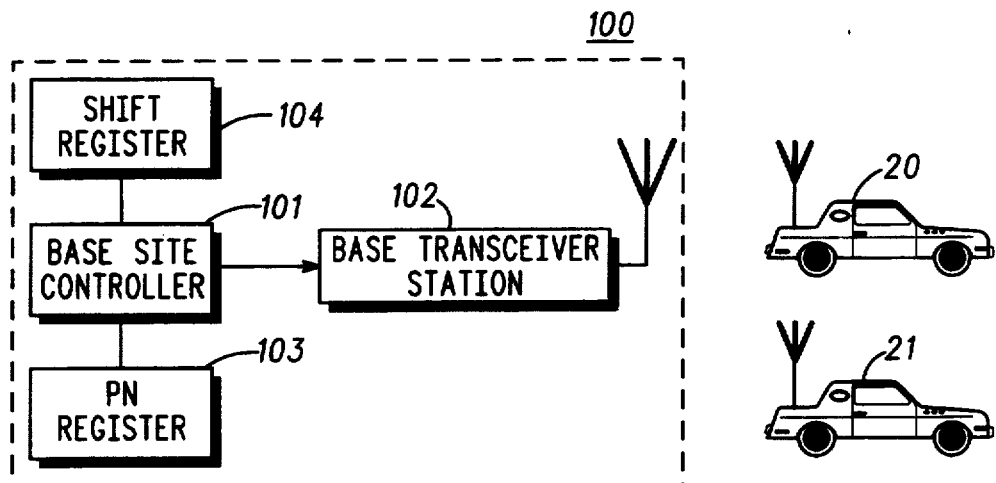
FIG. 4 comprises a block diagram of a BSS under the invention.

The solution to the problem of intra-cell adjacent channel utilization and near-cell reuse of communication resources while providing the advantages of frequency hopping and, a variable bandwidth format lies, conceptually, in spectral partitioning and rotation of partitioned subspectra (and user MSs) through an assigned frequency spectrum under control of an offset number. Under such a format an assigned spectrum is partitioned within each cell into a number of subspectra. MSs requesting service are assigned to subspectra based upon similarity of distance from the serving base site. Under such a format MSs located near the base site may be assigned to a first subspectrum and MSs located near a periphery of the service coverage area (distal communication units) may be assigned to a second subspectrum (distal subspectrum). MSs located in the middle may be assigned to a additional subspectra (three, four, etc).

Assignment of MSs to subspectra based upon distance (as determined by signal characteristics) from the base site allows MSs within a subspectrum to operate at substantially similar power levels. Operation of MSs at similar power levels may allow the MSs to be assigned to adjacent channels without concern for adjacent channel interference.

Assignment of MSs proximate to a base site, in a first cell, to a first subspectrum allows MSs within the first subspectrum to operate at very low power levels. Operation of the MSs (and base site) at very low power within the first subspectrum (and cell) may allow the first subspectrum to be simultaneously reused in an adjacent cell to serve MSs located in the adjacent cell.

The process of partitioning an assigned spectrum into a number of fixed (non-rotated) subspectra and allocation of MSs to adjacent channels in the same cell and the same channel in adjacent cells is described in co-pending application titled "Reduced Interference Through Frequency Partitioning" (Docket No. CE02184R U.S. application No. 07/797,628, filed Nov. 15, 1991, now abandoned) by inventors Bruckert and Kotzin, assigned to Motorola, Inc, and incorporated herein by reference.

The frequency partitioning system, as described in co-pending application CE02184R, provides for adjacent channel utilization within certain areas of a cell and co-channel reuse in areas of adjacent cells. Co-pending application CE02184R, on the other hand, does not provide a mechanism for frequency hopping within the partitioned, fixed frequency subspectra. Moreover, frequency hopping may not be appropriate under the system taught by co-pending application CE02184R (e.g. analog cellular radiotelephones). The system taught by co-pending application CE02184R also does not provide a mechanism for frequency hopping RF channels of different bandwidth within partitioned subspectra.

FIG. 1 depicts partitioning of an assigned frequency spectrum (containing frequency numbers (FRNs) 1 through N) into a number of non-coincidental subspectra (C, M, and F), both within the assigned spectrum of each cell of the three cells (∅1, ∅2, and ∅3) and among FRNs of the three cells (∅1, ∅2, and ∅3). The partitioning of the assigned spectrum into non-coincidental subspectra, for the three cells (∅1, ∅2, and ∅3), effectively provides a three-cell reuse pattern for the three cells (∅1, ∅2, and ∅3).

As shown in FIG. 1 the lowest frequencies of the assigned spectrum for cell ∅2 are allocated to MSs closest to the base site in cell ∅2 (as reflected by entry of the letter "C" in the low frequency (FRN=1) end of the assigned spectrum opposite cell indicator ∅2). Simultaneously the same frequencies may be allocated to distal MSs near the periphery of service in cell ∅1 (as indicated by entry of the letter "F"). The same frequencies may also be simultaneously allocated to MSs midway between base site and periphery in cell ∅3.

Co-channel interference within such a system (10) may be maintained below a threshold by physical separation of MSs. Physical separation of reusing MSs is ensured by limiting cochannel reuse to adjacent cells and to certain physical locations within the adjacent cells. Physical locations of an MS (distance from a base site) may be determined through signal characteristics (such as signal quality) measured by MSs and base sites. Signal quality measurements may be signal strength or bit error rates. Determination of relative location may be determined by comparison of signal characteristics with a threshold (or thresholds). MSs providing a high level signal quality factor may be determined to be proximate the base site while distal MSs providing a low level signal quality value may be determined to be near the periphery of a service coverage area.

Physical distance of an MS from a base site may also be determined by further signal characteristics (e.g. timing delay associated with signal transmissions between base sites and MSs). In either case (through use of signal quality factors or timing delays) the base site acts to group MSs having similar signal characteristics to a partitioned subspectrum (C, M, or F) indicative of distance from the serving base site.

In grouping MSs into partitioned subspectra (C, M, or F), MSs operating within a subspectrum (C, M, or F) may be operated at similar power levels. Operation of MSs at similar power levels may allow MSs within a subspectrum (C, M, or F) to be operated on adjacent channels without concern for adjacent channel interference.

In one embodiment of the invention disclosed hereunder subspectra (C, M, and F) may be circularly rotated through the assigned spectrum under control of an offset number uniquely generated for each TDM frame. The subspectra (C, M, and F) may be offset, synchronously, one or more FRNs from partitioned location (FIG. 1) (in a positive or negative direction) for each TDM frame while maintaining a fixed relative relationship among subspectra (C, M, and F) of the same and adjacent cells (∅1, ∅2, and ∅3).

The spectral shifting of subspectra (C, M, and F) may be accomplished, for each of the three cells (∅1, ∅2, and ∅3), by creating a circular shift register having shift register locations 1 — N (containing ordered FRN numbers 1 — N). The shift register may be partitioned in a manner similar to the partitioning of the assigned spectrum (FIG. 1) into shift register sections C, M, and F. Shift register section C may be chosen to contain the FRNs shown in subspectrum C of FIG. 1. Likewise, shift register locations M and F may be chosen to contain the FRNs shown in subspectra M and F (FIG. 1) respectively.

Shown in FIG. 7 are three such circular shift registers for the three cells (∅1, ∅2, and ∅3). The spectral shifting of subspectra C, M, and F for the three cells (∅1, ∅2, and ∅3) may be accomplished by synchronously, circularly shifting the contents of the three shift registers (shift register locations C, M, and F) under control of an offset number. An MS (20 or 21) under such an arrangement would be assigned a shift register location of the shift register associated with the serving cell (∅1, ∅2, or ∅3) (it being understood that the assigned shift register location contains the FRN number of an RF communication channel within which a communicated signal would be exchanged, through the serving BTS, during a particular TDM frame). The contents of the assigned shift register location, according to the invention, comprises a communication resource allowing the MS (20 or 21) to exchange a communicated signal within a subspectrum (C, M, or F) based upon the distance between the MS (20 or 21) and the serving BTS (11, 12, or 13).

In the above example of the partitioned shift register (FIG. 7) and before application of an offset number shift register location (SRL) 1 may contain FRN 1. (SRL 1 in cell ∅1, ∅2, or ∅3 may be referred to, by subspectrum location (e.g. $F_1$ in cell ∅1, $C_1$ in cell ∅2, and $M_1$ in cell ∅3)). Likewise SRL N may contain FRN N. Under the invention the offset number is simultaneously applied to the three shift registers (∅1, ∅2, and ∅3), thereby maintaining the fixed relative locations of subspectra among the cells.

Figure 6:
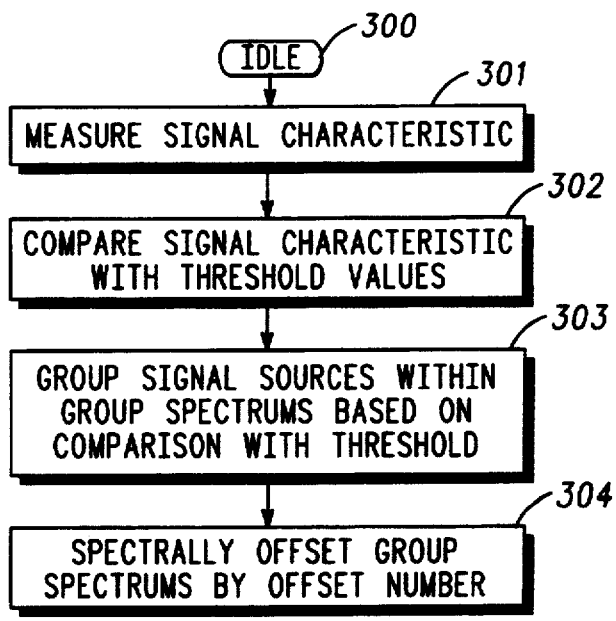
FIG. 6 is a flow chart depicting the process of channel assignment and channel rotation under the invention.

The method used under the invention is shown in a flow chart (FIG. 6). Reference will be made to the flow chart (FIG. 6) as appropriate to describing the invention.

Shown within dotted lines of FIG. 4 is a base station system (BSS) (100) generally in accordance with the invention. Included within such a BSS (100) is a base site controller (BSC) (101), a shift register (104), a pseudo-random number generator (PN Register) (103), and base transceiver stations (BTS) (102). Also shown (FIG. 4) are mobile stations (MS) (20 and 21) (as used herein "mobile station" and "mobile subscriber" refer to mobile communication units or portable communication units).

Figure 5:
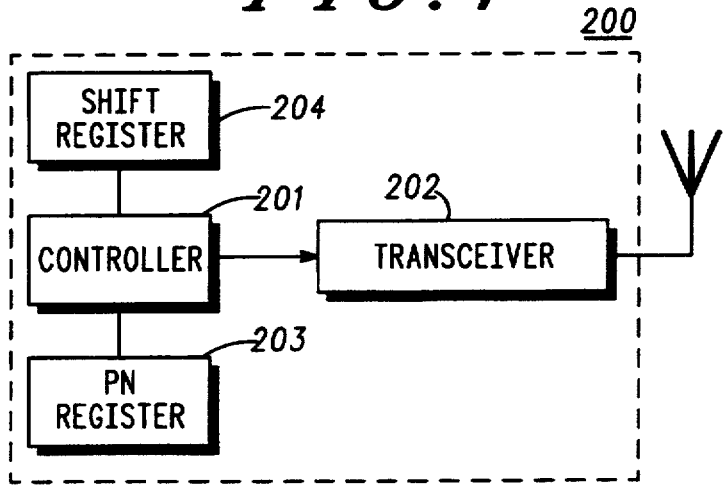
FIG. 5 comprises a block diagram of a MS under the invention.

Shown in dotted lines of FIG. 5 is a block diagram describing MSs 20 or 21 generally (200). Included within the MSs (20 and 21) are a controller (201), a transceiver (202), a shift register (204), and a PN register (203). PN register (103) within the BSS (100) and the PN register (202) within MS (20 or 21) provide a means for generating offset numbers. PN registers (103 and 203) may be constructed to generate the same sequence of digits during the same time frame and together provide a means for generating an identical offset number at the BSS (100) and MS (20 or 21).

The BSC (101) may control additional BTSs (not shown) which serve other cells (other sectors at the same site or cells at remote locations). In conjunction with a mobile switching center (not shown), one or more BSSs (100) may provide communication services throughout a relatively large geographic area (10, FIG. 2) through a number of BTSs (102) distributed throughout the geographic area (10). In such a case each BTS (102) offers communication services within a service coverage area (∅1, ∅2, or ∅3) covering a portion of the large geographic area (10). Communication services offered within the relatively small geographic areas (∅1, ∅2, and ∅3) are provided through BTSs (102) located at base sites (11, 12, and 13) centrally located within the small service coverage areas (∅1, ∅2, and ∅3). (BTSs (102) located at base sites (11, 12, and 13) will hereinafter be individually referred to as BTS 11, BTS 12 and BTS 13.) Each BTS may have one or more radio transceivers.

In accordance with the teachings of the invention, BTSs (11, 12 and 13), and MSs (20 and 21) exchange communicated signals on a communication resource including an uplink and a downlink. The communicated signal transferred on the uplink by a MS (20 or 21) to a proximate BTS on an carrier frequency is transmitted under the control of the proximate BTS.

The downlink BCCH of the BTS (11, 12 or 13) contains distinctive identification signals as well as synchronization and timing information common to an assigned spectrum (frequencies (FRNs) 1—N) and slots of the transmitting BTS (11, 12, or 13). Transmitted along with the timing and synchronization information may be a nonambiguous frame number (FN) (see GSM Recommendation 4.3.3). The FN provides a means for associating a long repeat period, incriminating number to time frames. The nonambiguous FN is utilized by the MS (20 or 21), in conjunction with other information communicated to the subscriber MS (20 or 21) from the BTS (11, 12, or 13) to allow the subscriber MS (10), to determine the specific frequency used for a particular frame. The particular hopping algorithms employed and the prudent assignment of parameters by the cellular system controller (BSC 101) ensures that the instantaneous radio frequencies used by each MS (20 or 21) served by a particular BTS (11, 12, or 13) are distinct and non-overlapping.

As an example, MS (20), desiring access to the system, scans for and identifies the BCCH of the BTS (11). The MS (20) monitors for and detects information (FN, MA, and MAIO) defining a uplink communication resource over which to transmit an access request. Upon transmitting the access request the MS (10) monitors the CCCH on the downlink primary channel ($f_1$) for channel assignment messages.

Channel assignment messages may be communicated, as provided within GSM recommendations, from the BTS (11) to the MS (20). These assignment messages, through suitable encoding, provide the user MS (20) with the specific parameters necessary to unambiguously determine the specific frequency and slot in which information between the BTS and MS may be exchanged.

To facilitate the use of this invention, it is necessary to transmit additional command information alerting the MS (10) to employ the proposed offset, (matched power level) subspectrum inventive concept. The preferred method for providing this information is to include in every assignment message, a description of a logical state of the means for generating offset numbers. Also included in the assignment message is a subspectrum assignment within the shift register and the current content of the shift register. In this manner, it is possible to independently describe the communication resource (and offset algorithm) that is to be used for uplink and the downlink transmissions. The relationship of uplink and downlink radio channels and slots are inferred by the defined 3 slot time offset and 45 MHz frequency offset.

Channel identification may be performed by the BSC (101) based upon signal characteristics. If the requesting MS (20) is determined (through comparison (302) of measured signal characteristics to a threshold) to be near the periphery of cell ∅1, then a subspectrum (shift register) location (e.g. $F_1$) from subspectrum F may be allocated (303).

Once a shift register location is determined then a FRN number (channel location) must be simultaneously determined for each TDM frame by BTS (102) and MS (20) based upon independently generated offset numbers. The shift register location of MS (20) ($F_1$) may then be combined (304) with the offset number to create an RF channel location for each TDM frame.

Channel location (FRN number) (F) (combining shift register location assignment and offset) for each communication resource for each TDM frame may be determined for MS (20) and BTS (11) through use of the equation as follows:

$$F_{t+1}=(F_t+f(t+1))mod(N)$$

where:
F is RF channel number $0 \leq F \leq N-1$
N is the number of available RF channels within the assigned frequency spectrum
f(t) is the offset number: $0 \leq |f| \leq N-1$ The offset number, f(t), may be determined by reference to the means for generating offset numbers (e.g. through use of pseudo-random number generators 103 and 203). The offset number may be determined by reference to the contents of the first k+1 stages of an N-stage pseudo-random number generator (PN register) where k<<N. The first k stages of the PN register may contain the offset number in binary. The k+1 stage may provide the sign (positive or negative) of the offset number (sgn(f(t))=$(-1)^x$) (where x is the value (0 or 1) of the k+1 stage).

Inclusion of a description of a logical state of the means for generating offset numbers in the assignment message from BTS (102) to MS (20) insures that BTS (102) and MS (20) generate identical offset numbers for a particular TDM frame. Following exchange of a communicated message on a TDM frame the PN register may be incriminated by L steps (L>1) (before the next frame), thereby generating a new offset number for a subsequent TDM frame.

The size of the offset number generated by a PN register may be limited by the value chosen for k. A small value of k may be chosen if large jumps are difficult for a frequency synthesizer to achieve. A correspondingly large value may be chosen if large frequency jumps do not represent a problem for synthesizers within MSs and BTSs within the system.

Figures 3A, 3B, 3C:
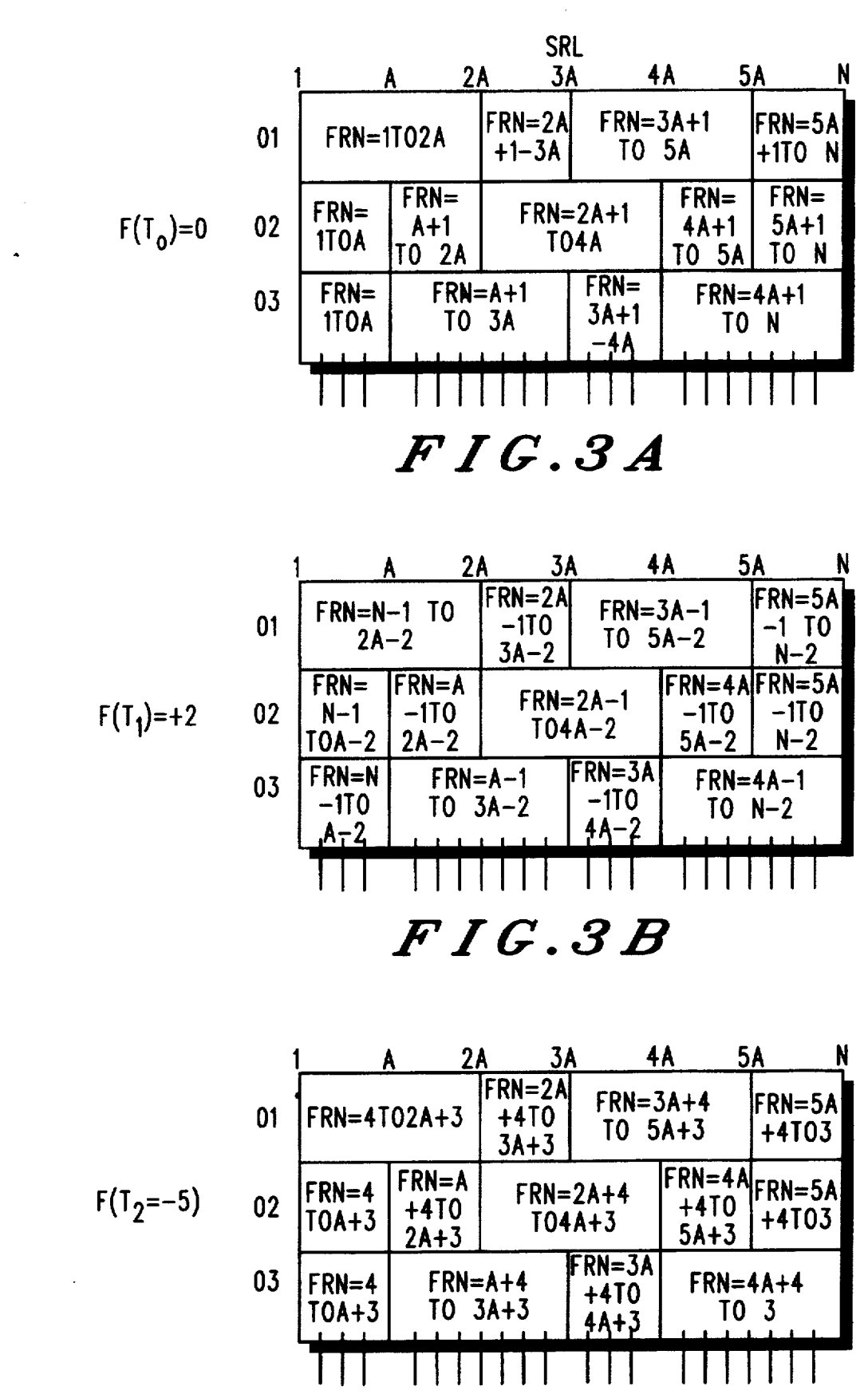

FIG. 3a depicts, generally, shift registers (1—N) for subspectra (C, M, and F) of cells ∅1, ∅2, and ∅3 during three time intervals ($T_o$, $T_1$, and $T_2$). (In FIGS. 3a to 3c subspectra C, M, and F have been assumed to be of equal bandwidth and to each contain 2a FRNs.) Depicted within the blocks (subspectra C, M, and F) are the locations of FRNs (FRN=1 to N) during the three time intervals ($T_o$, $T_1$, and $T_2$). Time $T_o$ may be assumed to reflect frequency partitioning (FIG. 1) under the reuse algorithm for the system. As an example, at time $T_1$ (after incriminating the PN register by L steps) an offset number of +2 may be generated. An offset number of +2 (at time $T_1$) causes the partitioned baseband (FIG. 3a) channels to shift two FRNs to the right (FIG. 3b). It may be noted that the highest channels (FRN=N and N−1) were rotated from the right to the left side of the shift register.

At time, T2 a similar result may be produced. At time, T2 an offset number of −5 may be generated by the means for generating offset numbers. An offset number of −5 (FIG. 3c) causes channels within subspectra (C, M, and F) to shift five FRNs to the left. Channels (FRNs=N, N−1, 1, 2, and 3) are rotated from the left side of the shift register into the right side of the shift register.

As may be noted by reference to FIGS. 3a to 3c, assignment of the requesting MS (20) to channel number $F_1$ in cell ∅1 causes the MS (20) and BTS (11) to transceive on channel, FRN=N−1, at time $T_1$ and on channel, FRN=4, at time $T_2$.

In another embodiment of the invention it may be desirable to further randomize the effects of interference by causing communication channels within a power grouping (subspectra C, M, or F) to hop (change relative FRNs) within a subspectrum (C, M, or F) under control of a randomizing number. Channel hopping over FRNs within a subspectrum (C, M, or F) may be facilitated by referencing a look-up table for the randomizing number wherein each channel within a subspectrum contains a randomizing number in the form of an associated channel (and associated baseband FRN) within the subspectrum to which an MS hops. In general, if a present channel is $C_{j(t)}$, within the C subspectrum, then the associated channel (FRN) to which an MS hops, for the next TDM frame is $C_{j(t+1)}$. Such an algorithm may be described in the context of subspectrum C, with maximum channel number of n1, as follows:

$$F_x = (F_t + (C_{j(t+1)} - C_{j(t)}))(mod\ n1),$$

where Fz is channel number within subspectrum C. Such an algorithm may be expressed in the context of the assigned spectrum to generate channel location as follows:

$$F_{t+1} = (F_x + f(t+1))Mod\ (N),$$

where the look-up table expressed as:

$$t = t + 1:\quad C_A\ |\ C_B\ |\ \ldots C_{j(t+1)}\ \ldots\ |\ C_M$$
$$t = t\quad\quad C_1\ |\ C_2\ |\ \ldots C_{j(t)}\ \ldots\ |\ C_{n1}$$

and, $$0 \leq A \neq B \neq C \neq \ldots \neq M \leq n1,\ 1 \leq C_i \leq n1.$$

Intra-subspectrum hopping within subspectra M ($F_y$) and F ($F_z$) may be processed in a substantially identical manner.

In the alternative, channels within a subspectrum (C) may be randomized using a second PN register. The second PN register generating a randomizing number in the form of a subspectrum offset number (S) which may then be used to shift channels within the subspectrum (C). Such an algorithm may be expressed as follows:

$$F_t' = F_1 + (F_t + S - F_1)mod(n1),$$

where:

$F_t$ is the present RF channel, $F_1$ is the first frequency of a group, n1 is the number of channels within the group, and S is the intra-subspectrum offset number.

In the context of the assigned spectrum, channel location within the hopped subspectrum C then becomes:

$$F_{t+1} = (F_t' + f(t+1))mod\ (N).$$

In another embodiment of the invention variable bandwidth traffic channels can be accommodated through use of the channel rotation algorithm. In such a case, the assigned spectrum consists of N channels of the smallest bandwidth channel. The largest RF channel consists of a channel H times the bandwidth of the smallest RF channel. Values of H and N in such a case may be downloaded to MSs from the BTS during the BCCH selection process. Variable bandwidth channels may be accommodated by the equation as follows:

$$F_{t+1} = (F_t + f(t+1))mod(N)$$

where:

F is RF channel number $0 \leq F \leq N-1$

N is the number of available RF channels within the assigned frequency spectrum and is evenly divisible by H n(k) is an offset number generated by the means for generating offset numbers, $f(t) = n(k) * H$.

In the alternative, variable bit rate channels may be accommodated by splitting the total number of channels within a subspectrum (C, M, or F) into two parts (C and C', M and M', and F and F'). C, M, and F may be normal bandwidth channels. C', M', and F' may consist of wideband channels which are a multiple of the bandwidths of channels within C, M, or F. Rotation of channels in such case would be substantially identical as the first example except that when a channel within C', M', F' reaches the extremes of the assigned spectrum, an incremental change in the offset number would cause the spectral shift of rotation for such channels to be a multiple of the shift for normal narrow channel bandwidth.

In another embodiment of the invention intra-cell handovers may be affected based upon changes in distance of an MS to a BTS (as detected by changes in signal characteristics). Upon measurement and detection that the signal characteristic of an MS exceeds a threshold value, an MS may be assigned a channel within a handover subspectrum (C, M, or F) by commands communicated to the MS over a control channel. Information communicated to the MS to affect the change may include a baseband channel number, the logical state of the means for generating offset numbers, and a unique, nonambiguous frame number (FN). The FN identifies the precise frame for which the MS must tune to the handover subspectrum.

In the alternative if the handover is to an adjacent cell then an inter-cell handover may be required. In the case where the target cell is synchronized to the requesting cell then the process of inter-cell handover may be the same as an intra-cell handover. If the target cell is not synchronized to the requesting cell, then a time delay may be required to synchronize the MS to the target cell.

While a particular embodiment of the system and equipment according to the invention has been shown and described in a GSM-like context, it should be understood that the invention is not limited thereto since many modifications may be made. The invention, as described, is applicable to any digital cellular system allowing frequency hopping. It is therefore, contemplated to cover by the present application any and all such modifications that fall within the true spirit and scope of the basic underlying principles disclosed and claimed herein.

We claim:

1. A method of assigning communication resources within a cell of a cellular communication system, such method including the steps of: A) grouping communication units based upon a signal metric indicative of distance from a base site of the cell; B) assigning the grouped communication units to group subspectra that includes an at least one distal subspectrum reserved for distal communication units, which distal subspectrum is non-coincident with distal spectra of adjacent cells; and, C) spectrally offsetting the group subspectra based, in part, upon an offset number.

2. The method as in claim 1 further including the step of measuring the signal characteristic.

3. The method as in claim 2 further including the step of determining the signal characteristic to be a signal quality factor.

4. The method as in claim 2 further including the step of determining the signal characteristic to be transmission delay.

5. The method as in claim 1 further including the step of defining the group subspectra to be mutually exclusive subspectra of an assigned frequency spectrum.

6. The method as in claim 1 wherein the step of spectrally offsetting the group spectra further includes the step of generating an offset number.

7. The method as in claim 6 wherein the step of generating an offset number further includes the step of multiplying an output of a means for generating an offset number by a ratio determined by comparison of an allocated wideband channel to an allocated narrowband channel.

8. The method as in claim 1 further including the step of randomizing, within a group spectrum, an allocated baseband channel for a signal source.

9. The method as in claim 8 wherein the step of randomizing an allocated baseband channel further includes the step of referencing a look-up table for a randomizing number.

10. The method as in claim 8 wherein the step of randomizing an allocated baseband channel further includes the step of generating an subspectrum offset number as a randomizing number.

11. The method as in claim 1 further including the step of handing over a communication unit from one group spectrum to another.

12. The method as in claim 11 wherein the step of handing over a communication unit from one group spectrum further includes the step of determining a need for a handover based upon comparison of a signal characteristic of the communication unit with a threshold.

13. The method as in claim 12 wherein the step of determining a need for a handover based upon comparison of a signal characteristic of the communication unit with a threshold further includes the step of measuring the signal characteristics of the communication unit.

14. An apparatus for assigning communication resources within a cell of a cellular communication system, such apparatus comprising: A) means for grouping communication units based upon a signal metric indicative of distance from a base site of the cell; B) means for assigning the grouped communication units to group subspectra that includes an at least one distal subspectrum reserved for distal communication units, which distal subspectrum is non-coincident with distal spectra of adjacent cells; and, C) means for spectrally offsetting the group subspectra based, in part, upon an offset number.

15. The apparatus as in claim 14 further comprising means for measuring the signal characteristic.

16. The apparatus as in claim 15 wherein the means for measuring the signal characteristic further comprises means for determining a signal quality factor.

17. The apparatus as in claim 15 wherein the means for measuring the signal characteristic further comprises means for determining a transmission delay.

18. The apparatus of claim 14 wherein the means for spectrally offsetting the group of spectra further comprises means for generating an offset number.

19. The apparatus as in claim 18 wherein the means for generating an offset number further comprises means for multiplying an output of a means for generating an offset number by a ratio determined by comparison of an allocated wideband channel to an allocated narrowband channel.

20. The apparatus as in claim 14 further comprising means for randomizing, within a group spectrum, an allocated baseband channel for a signal source.

21. The apparatus as in claim 20 wherein the means for randomizing an allocated baseband channel further comprises means for referencing a look-up table for a randomizing number.

22. The apparatus as in claim 20 wherein the means for randomizing an allocated baseband channel further comprises means for generating an subspectrum offset number as a randomizing number.

23. The apparatus as in claim 14 further comprising means for handing over a communication unit from one group spectrum to another.

24. The apparatus as in claim 23 wherein the means for handing over a communication unit from one group spectrum further comprises means for determining a need for a handover based upon comparison of a signal characteristic of the communication unit with a threshold.

25. The apparatus as in claim 24 wherein the means for determining a need for a handover based upon comparison of a signal characteristic of the communication unit with a threshold further comprises means for measuring the signal characteristics of the communication unit.

26. A method of reducing interference within a cellular system, such method including the steps of:
   A) in one region;
      1) allocating channels to radiotelephones having characteristic properties,
      2) allocating other channels to radiotelephones not having the characteristic properties,
      3) offsetting the allocated channels based, in part, upon an offset number,
   B) in another potentially interfering region;
      1) allocating the other channels to radiotelephones having characteristic properties,
      2) allocating the channels to radiotelephones not having the characteristic properties, 3) offsetting the allocated channels based, in part, upon an offset number.

27. The method as in claim 26 wherein the step of offsetting the allocated channels further includes the step of generating an offset number.

28. The method as in claim 27 wherein the step of generating an offset number further includes the step of multiplying an output of a means for generating an offset number by a ratio determined by comparison of an allocated wideband channel to an allocated narrowband channel.

29. An apparatus for reducing interference within a cellular system, such apparatus comprising;
  A) in one region;
    1) means for allocating channels to radiotelephones having characteristic properties,
    2) means for allocating other channels to radiotelephones not having the characteristic properties,
    3) means for offsetting allocated channels based, in part, upon an offset number,
  B) in another potentially interfering region;
    1) means for allocating the other channels to radiotelephones having the characteristic properties
    2) means for allocating the channels to radiotelephones not having the characteristic properties,
    3) means for-offsetting the channel allocation based, in part, upon an offset number.

30. The apparatus of claim 29 wherein the means for offsetting the allocated channels further includes means for generating an offset number.

31. The apparatus as in claim 30, wherein the means for generating an offset number further includes means for multiplying an output of a means for generating an offset number by a ratio determined by comparison of an allocated wideband channel to an allocated narrowband channel.

32. A method of reducing interference within a cellular communication system having a plurality of base station sites, each upon occasion, providing communication services within a designated frequency spectrum to user communication units within a service coverage area of the base station site, such method including the step of:
  A) partitioning the designated frequency spectrum into a first and an at least second spectrum inclusive of the designated frequency spectrum at a base station site;
  B) receiving at the base station site a service request from a communication unit and measuring a signal characteristic of the service request;
  C) allocating, by the base station site, a communication resource within the first spectrum to the communication unit when the measured signal characteristic exceeds a threshold and within the at least second spectrum to a communication unit when the measured signal characteristic does not exceed the threshold, and;
  D) spectrally offsetting allocated resources based, in part, upon an offset number.

33. The method as in claim 32 further including the step of; partitioning the designated frequency spectrum for an at least second spectrum serving adjacent locations in adjacent service coverage areas to substantially non-coincidental frequencies of the designated frequency spectrum.

34. The method as in claim 32 further including the step of; performing secondary signal measurements of communication unit, communication transactions and maintaining signal quality by adjusting transmission power within a spectrum power range.

35. The method as in claim 32 wherein the step of partitioning the designated frequency spectrum further includes the step of adjusting the partitioning of the designated frequency spectrum based upon base station site loading.

36. The method as in claim 35 wherein the step of adjusting the partitioning further includes the step of calculating system loading based upon data contained within memory.

37. The method as in claim 32 wherein the step of spectrally offsetting the first and an at least second spectrum further includes the step of generating an offset number.

38. The method as in claim 37 wherein the step of generating an offset number further includes the step of multiplying an output of a means for generating an offset number by a ratio determined by comparison of an allocated wideband channel to an allocated narrowband channel.

39. The method as in claim 32 further including the step of randomizing, within the first and an at least second spectrum, the allocated resource for the communication unit.

40. The method as in claim 39 wherein the step of randomizing an allocated baseband channel further includes the step of referencing a look-up table for a randomizing number.

41. The method as in claim 39 wherein the step of randomizing an allocated baseband channel further includes the step of generating an subspectrum offset number as a randomizing number.

42. The method as in claim 32 further including the step of handing over the communication unit among the first and an at least second spectrum.

43. The method as in claim 42 wherein the step of handing over a signal source from one group spectrum further includes the step of determining a need for a handover based upon comparison of a signal characteristic of the communication unit with a threshold.

44. The method as in claim 43 wherein the step of determining a need for a handover based upon comparison of a signal characteristic of the communication unit with a threshold further includes the step of measuring the signal characteristics of the communication unit.

45. A device for reducing interference within a cellular communication system having a plurality of base station sites, each upon occasion, providing communication services within a designated frequency spectrum to user communication units within a service coverage area of the base station site, such device comprising:
  A) means for partitioning the designated frequency spectrum into a first and an at least second spectrum inclusive of the designated frequency spectrum at the base station site;
  B) means for receiving at the base station site a service request from a communication unit and measuring a signal characteristic of the service request;
  C) means for allocating, by the base station site, a communication resource within the first spectrum to the communication unit when the measured signal characteristic exceeds a threshold and within the at least second spectrum to a communication unit when the measured signal characteristic does not exceed the threshold, and;
  D) means for spectrally offsetting communication resources based, in part, upon an offset number.

46. The device as in claim 45 further comprising; means for performing secondary signal measurements of communication unit, communication transactions and maintaining signal quality by adjusting transmission power within a spectrum power range.

47. The device as in claim 45 wherein the means for partitioning the designated frequency spectrum further comprising; means for adjusting the partitioning of the designated frequency spectrum based upon base station site loading.

48. The device as in claim 47 wherein the means for adjusting the partitioning further comprising; means for calculating system loading based upon data contained within memory.

49. The device as in claim 45 wherein the means for offsetting the first and an at least second spectrum further includes means for generating an offset number.

50. The device as in claim 49 wherein the means for generating an offset number further includes means for multiplying an output of a means for generating an offset number by a ratio determined by comparison of an allocated wideband channel to an allocated narrowband channel.

51. The device as in claim 45 further including the means for randomizing, within the first and an at least second spectrum, the allocated resource for the communication unit.

52. The device as in claim 51 wherein the means for randomizing an allocated baseband channel further includes means for referencing a look-up table for a randomizing number.

53. The device as in claim 51 wherein the means for randomizing an allocated baseband channel further includes means for generating an subspectrum offset number as a randomizing number.

54. The device as in claim 45 further including means for handing over the communication unit among the first and an at least second spectrum.

55. The device as in claim 54 wherein the means for handing over a signal source from one group spectrum further includes means for determining a need for a handover based upon comparison of a signal characteristic of the communication unit with a threshold.

56. The device as in claim 55 wherein the step of determining a need for a handover based upon comparison of a signal characteristic of the communication unit with a threshold further includes the step of measuring the signal characteristics of the communication unit.

57. A method of reducing interference within a cellular communication system having a plurality of base station sites, each upon occasion, providing communication services within a designated frequency spectrum to user communication units within a service coverage area of the base station site, such method including the steps of:
   A) partitioning the designated frequency spectrum into a first and an at least second spectrum inclusive of the designated frequency spectrum at a base station site;
   B) receiving at the base station site a service request from a communication unit and measuring a signal characteristic of the service request, and;
   C) comparing the measured signal characteristic with an at least first threshold;
   D) allocating, by the base station site, to the communication unit, a communication resource within a spectrum of the first and at least second spectrum based upon the relative magnitude of the measured signal characteristic, and;
   E) spectrally offsetting the group spectrums based, in part, upon an offset number.

58. The method as in claim 57 further including the step of; partitioning the designated frequency spectrum for an at least second spectrum serving adjacent locations in adjacent service coverage areas to substantially non-coincidental frequencies of the designated frequency spectrum.

59. The method as in claim 57 further including the step of; performing secondary signal measurements of communication unit, communication transactions and maintaining signal quality by adjusting transmission power within a spectrum power range.

60. The method as in claim 57 wherein the step of partitioning the designated frequency spectrum further includes the step of adjusting the partitioning of the designated frequency spectrum based upon base station site loading.

61. The method as in claim 60 wherein the step of adjusting the partitioning further includes the step of calculating system loading based upon data contained within memory.

62. The method as in claim 57 wherein the step of spectrally offsetting the first and an at least second spectrum further includes the step of generating an offset number.

63. The method as in claim 57 wherein the step of generating an offset number further includes the step of multiplying an output of a means for generating an offset number by a ratio determined by comparison of an allocated wideband channel to an allocated narrowband channel.

64. The method as in claim 57 further including the step of randomizing, within the first and an at least second spectrum, an allocated baseband channel for a communication unit.

65. The method as in claim 64 wherein the step of randomizing an allocated baseband channel further includes the step of referencing a look-up table for a randomizing number.

66. The method as in claim 64 wherein the step of randomizing an allocated baseband channel further includes the step of generating an subspectrum offset number as a randomizing number.

67. The method as in claim 57 further including the step of handing over the communication unit among the first and an at least second spectrum.

68. The method as in claim 67 wherein the step of handing over a communication unit from one group spectrum further includes the step of determining a need for a handover based upon comparison of a signal characteristic of the communication unit with a threshold.

69. The method as in claim 68 wherein the step of determining a need for a handover based upon comparison of a signal characteristic of the signal source with a threshold further includes the step of measuring the signal characteristics of the communication unit.

70. A device reducing interference within a cellular communication system having a plurality of base station sites, each upon occasion, providing communication services within a designated frequency spectrum to user communication units within a service coverage area of the base station site, such device comprising:
   A) means for partitioning the designated frequency spectrum into a first and an at least second spectrum inclusive of the designated frequency spectrum at a base station site;

B) means for receiving at the base station site a service request from a communication unit and measuring a metric of the service request, and;

C) means for comparing the measured metric with an at least first threshold;

D) means for allocating, by the base station site, to the communication unit, a communication resource within a spectrum of the first and at least second spectrum based upon a relative magnitude of the measured metric, and;

E) means for offsetting communication resources based upon an offset number.

71. The device as in claim 70 further comprising; means for partitioning the designated frequency spectrum for an at least second spectrum serving adjacent locations in adjacent service coverage areas to substantially non-coincidental frequencies of the designated frequency spectrum.

72. The device as in claim 70 further comprising; means for performing secondary signal measurements of communication unit, communication transactions and maintaining signal quality by adjusting transmission power within a spectrum power range.

73. The device as in claim 70 wherein the means for partitioning the designated frequency spectrum further comprising; means for adjusting the partitioning of the designated frequency spectrum based upon base station site loading.

74. The device as in claim 73 wherein means for adjusting the partitioning further comprising; means for calculating system loading based upon data contained within memory.

75. The device as in claim 70 wherein the means for offsetting the first and an at least second spectrum for each TDM frame further includes means for generating an offset number for each TDM frame.

76. The device as in claim 75 wherein the means for generating an offset number further includes means for multiplying an output of a means for generating an offset number by a ratio determined by comparison of an allocated wideband channel to an allocated narrowband channel.

77. The device as in claim 70 further including the means for randomizing, within the first and an at least second spectrum, an allocated baseband channel for a communication unit.

78. The device as in claim 77 wherein the means for randomizing an allocated baseband channel further includes means for referencing a look-up table for a randomizing number.

79. The device as in claim 77 wherein the means for randomizing an allocated baseband channel further includes means for generating an subspectrum offset number as a randomizing number.

80. The device as in claim 70 further including means for handing over the communication unit among the first and an at least second spectrum.

81. The device as in claim 80 wherein the means for handing over a communication unit from one group spectrum further includes means for determining a need for a handover based upon comparison of a signal characteristic of the signal source with a threshold.

82. The device as in claim 81 wherein the step of determining a need for a handover based upon comparison of a signal characteristic of the communication unit with a threshold further includes the step of measuring the signal characteristics of the communication unit.

* * * * *